United States Patent [19]

Kitajima et al.

[11] Patent Number: 5,538,633

[45] Date of Patent: Jul. 23, 1996

[54] FILTER APPARATUS HAVING A CASING WITH IMPROVED STRUCTURE FOR HOLDING FILTER MEDIA

[75] Inventors: Kyoji Kitajima; Shunichi Nogami, both of Wako; Hiroaki Yamashita, Hamakita; Keiichi Katagiri, Hamakita; Naomi Muramatsu, Hamakita, all of Japan

[73] Assignees: Toyo Roki Seizo Kabushikikaisha, Shizuoka-ken; Honda Giken Kogyo Kabushiki Kaisha, Tokyo, both of Japan

[21] Appl. No.: 362,776

[22] Filed: Dec. 23, 1994

[30] Foreign Application Priority Data

Dec. 27, 1993 [JP] Japan .................................. 5-350077

[51] Int. Cl.$^6$ .................................................. B01D 25/00
[52] U.S. Cl. .................. 210/445; 210/171; 210/460; 210/461
[58] Field of Search .................................. 210/168, 171, 210/172, 232, 416.4, 416.5, 445, 446, 459–462; 55/505, 507

[56] References Cited

U.S. PATENT DOCUMENTS

| | | | |
|---|---|---|---|
| 3,014,592 | 12/1961 | Stephens | 210/168 |
| 4,113,627 | 9/1978 | Leason | 210/446 |
| 4,250,039 | 2/1981 | Cozzi et al. | 210/416.5 |
| 4,402,827 | 9/1983 | Joseph | 210/168 |
| 4,414,172 | 11/1983 | Leason | 210/445 |
| 4,450,081 | 5/1984 | Anderson et al. | 210/168 |
| 4,826,598 | 5/1989 | Cain | 210/445 |
| 5,049,274 | 9/1991 | Leason et al. | 210/445 |

*Primary Examiner*—Joseph W. Drodge
*Attorney, Agent, or Firm*—Wenderoth, Lind & Ponack

[57] ABSTRACT

A filter apparatus includes a box-shaped casing formed by connecting peripheral edges of first and second casing members each having a concavity and a filter composed of first and second filter media placed one upon the other and having respective peripheries held between substantially the entire peripheral edges of the first and second casing members such that the filter assumes the shape of a bag when disposed in the casing. The casing has a suction port and an exhaust port each communicating between the interior and the exterior of the casing. The filter communicates with the exterior of the apparatus through the suction or exhaust port of the casing. The first and second filter media have respective through holes and are closely adhered together at peripheral portions of the respective through holes.

9 Claims, 10 Drawing Sheets

FILTER APPARATUS HAVING A CASING WITH IMPROVED STRUCTURE FOR HOLDING FILTER MEDIA

BACKGROUND OF THE INVENTION

1. Field of the Invention

This invention relates to a filter of the type having a casing composed of two casing members.

2. Description of the Prior Art

FIGS. 11 to 14 illustrate a conventional filter apparatus of the above-described type. The filter apparatus is shown upside down for convenience' sake.

Figure 11:
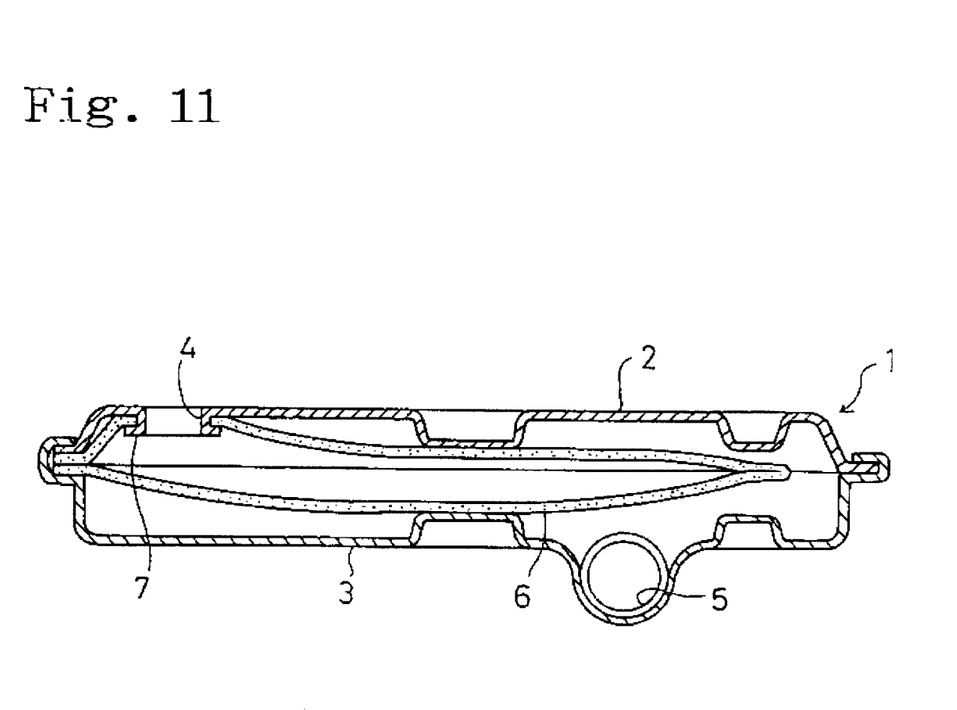
FIG. 11 is a sectional view of a conventional filter apparatus.
Figure 12:
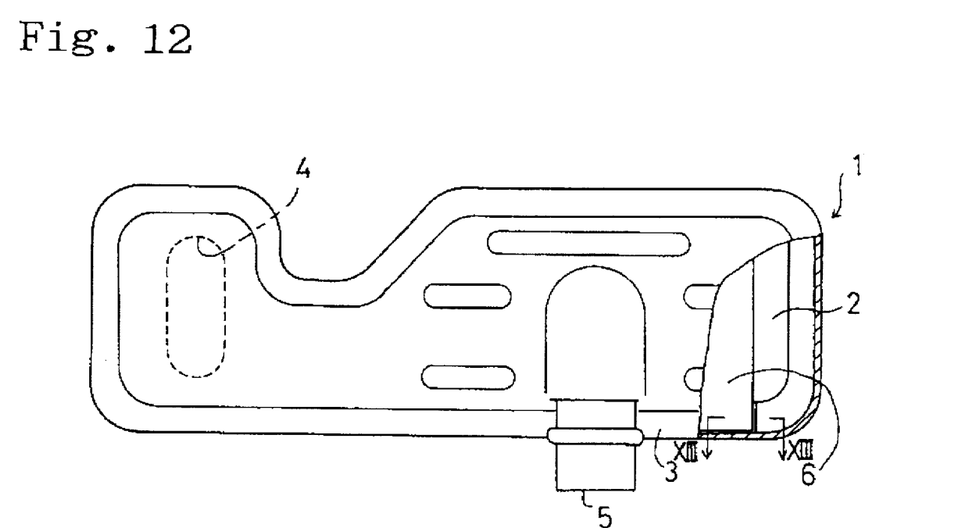
FIG. 12 is a bottom view of the conventional filter apparatus.
Figure 13:
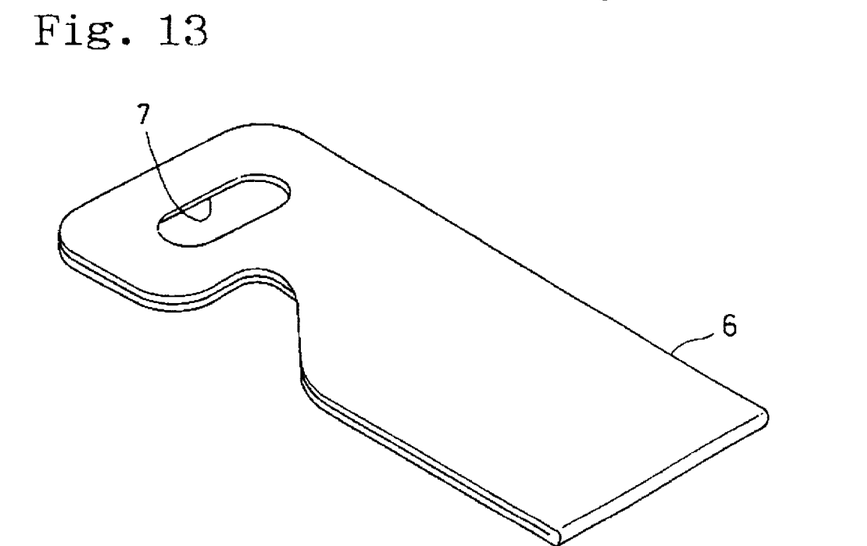
FIG. 13 is a perspective view of a filter employed in the conventional filter apparatus.

A casing 1 of the shown filter apparatus comprises lower and upper casing members 2 and 3 each of which has a concavity, as shown in FIGS. 11 and 12. The lower casing member 2 has a suction port 4 and the upper casing member 3 has an exhaust port 5. A filter 6 is formed by folding a sheet of filter medium back and has an opening 7 formed so as to correspond to the suction port 4 of the lower casing member 2, as shown in FIG. 13.

Figure 14:
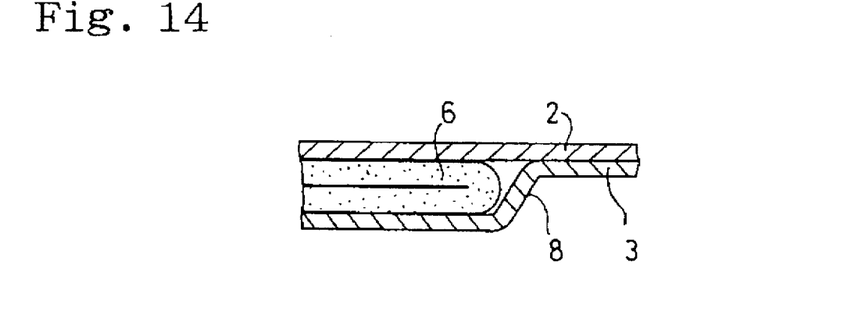
FIG. 14 is a sectional view taken along line 14—14 in FIG. 12.

The lower and upper casing members 2, 3 are placed so that the concavities thereof face each other with the filter 6 being enclosed. A peripheral edge of the lower casing member 2 is put into a peripheral curled portion of the upper casing member 3, thereby being held in position so that a seal is provided. In this state, the peripheral edge of the filter 6 is held between the peripheral edges of the lower and upper casing members 2, 3 except at its folded portion. Since portions of the peripheral edges of the casing members 2, 3 holding the peripheral edge of the filter 6 are continuous with those not holding it as shown in FIG. 14, the upper casing member 3 is previously formed with a stepped portion 8 so that the folded portion of the filter 6 can be positioned.

The folded portion of the filter 6 thus needs to be positioned with respect to the stepped portion 8 in the above-described filter apparatus. This positioning complicates the steps of assembling the filter apparatus. Furthermore, when the casing 1 is formed of a metal, the sealing performance is reduced at the portions of the peripheral edges of the casing members 2, 3 not holding the peripheral edge of the filter 6 therebetween. Additionally, since the filter medium is folded back through holes formed in the filter 6 to place the interiors of the casing members 2, 3 in communication cannot be located at an optimum position.

SUMMARY OF THE INVENTION

Therefore, an object of the present invention is to provide an improved filter apparatus wherein the sealing performance can be improved and the assembling steps can be simplified.

To achieve the object, the present invention provides a filter apparatus comprising a generally box-shaped casing formed by connecting peripheral edges of first and second casing members each having a concavity, the casing having a suction port and an exhaust port each placing the interior of the casing and the exterior thereof in communication and a filter comprising first and second filter media placed one upon the other and having respective peripheries held between substantially the entire peripheral edges of the first and second casing members such that the filter assumes the shape of a bag when disposed in the casing, the filter communicating with the exterior of the apparatus through the suction or exhaust port of the casing, the first and second filter media having through-holes formed therein, respectively, and being closely adhered together at peripheral portions of the respective through-holes. In order that the inner peripheral portions of the first and second filter media, which define the through- holes, are closely adhered together, these port ions may be bonded together by an adhesive, by melting materials of the first and second filter media, or by cramping the peripheral portions of the first and second filter media by with an annular metal member.

According to the above-described construction, the entire peripheral edges of the first and second filter media composing the filter are held between the peripheral edges of the first and second casing members. The conventional filter apparatus necessitates a stepped portion for positioning a portion of the peripheral edge of the filter not held between the peripheral edges of the casing members. However, such a stepped portion need not be provided in the above-described filter apparatus.

The filter media have inner peripheral edges defining the respective through holes and which peripheral edges are closely adhered together. The interiors of the first and second casing members communicate with each other through the through- holes though the filter is interposed between the casing members.

Thus, the invention can provide a filter apparatus which can eliminate the troublesome control in the assembling steps because it does not necessitate such a stepped portion as required in the conventional filter apparatus and which can improve the sealing performance.

BRIEF DESCRIPTION OF THE DRAWINGS

Other objects, features and advantages of the present invention will become clear upon reviewing the following description of the preferred embodiment thereof, made with reference to the accompanying drawings, in which.

DESCRIPTION OF THE PREFERRED EMBODIMENT

One embodiment of the present invention will now be described with reference to FIGS. 1 to 4. A filter apparatus of the embodiment is shown upside down for convenience' sake. A lower or first casing member 10 and an upper or second casing member 20 have the same contour. A peripheral portion of each casing member 10, 20 is bent so that each casing member has the shape of a dish. The casing members 10, 20 have flange-like abutting faces 11 and 21 formed by further bending peripheral edges thereof, respectively. The peripheral edge of the abutting face 21 of the upper casing member 20 is further bent upwardly, thereby providing a curled portion or a margin 21a for receiving the abutting face 11 of the lower casing member 10.

Figure 1:
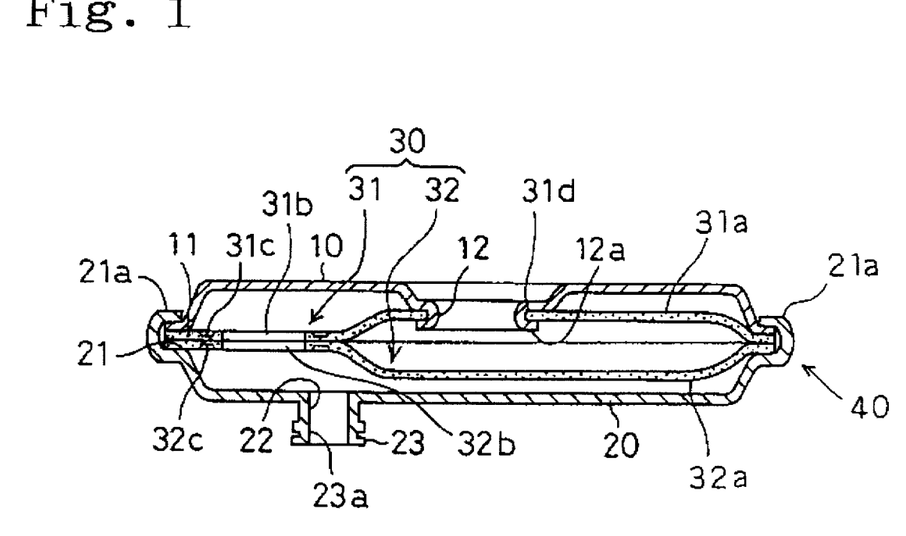
FIG. 1 is a sectional view of one embodiment of a filter apparatus in accordance with the present invention.
Figure 2:
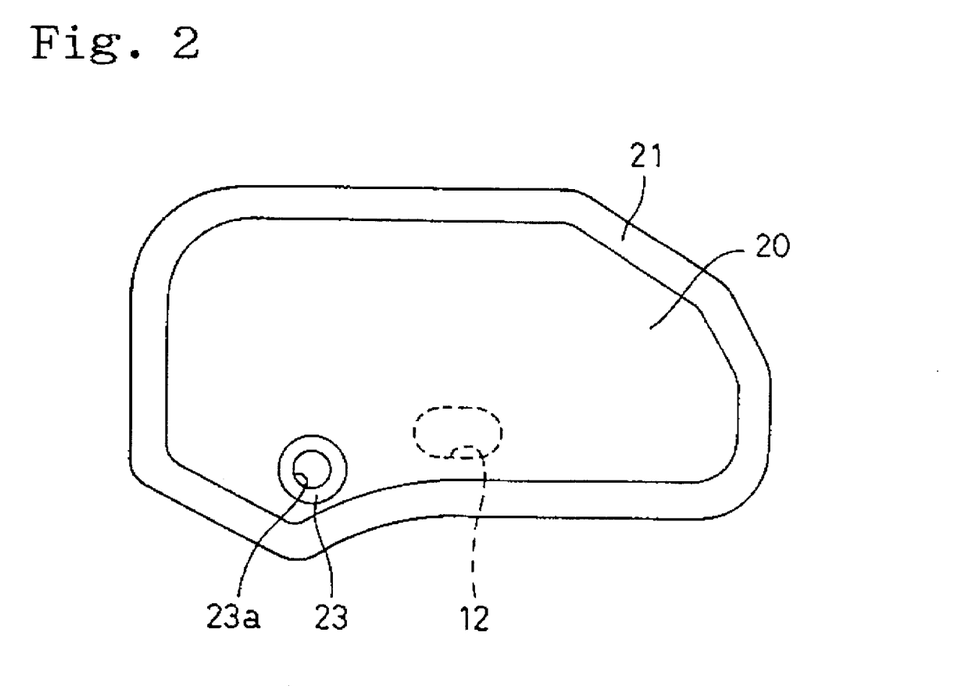
FIG. 2 is a bottom view of the filter apparatus.

The lower casing 10 has an oval suction port 12 formed therein. The peripheral edge of the suction port 12 is bent toward a concavity of the lower casing 10, thereby providing a cylindrical margin 12a. On the other hand, the upper casing member 20 has a circular through hole 22 to which a pipe 23 defining an exhaust port 23a is hermetically connected.

Figure 3:
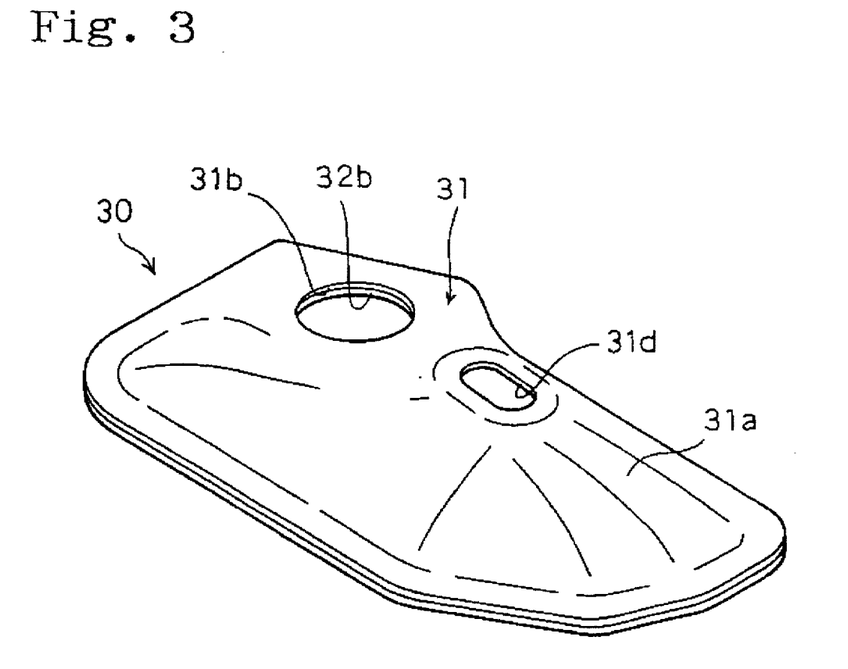
FIG. 3 is an enlarged perspective view of a filter employed in the filter apparatus.
Figure 4:
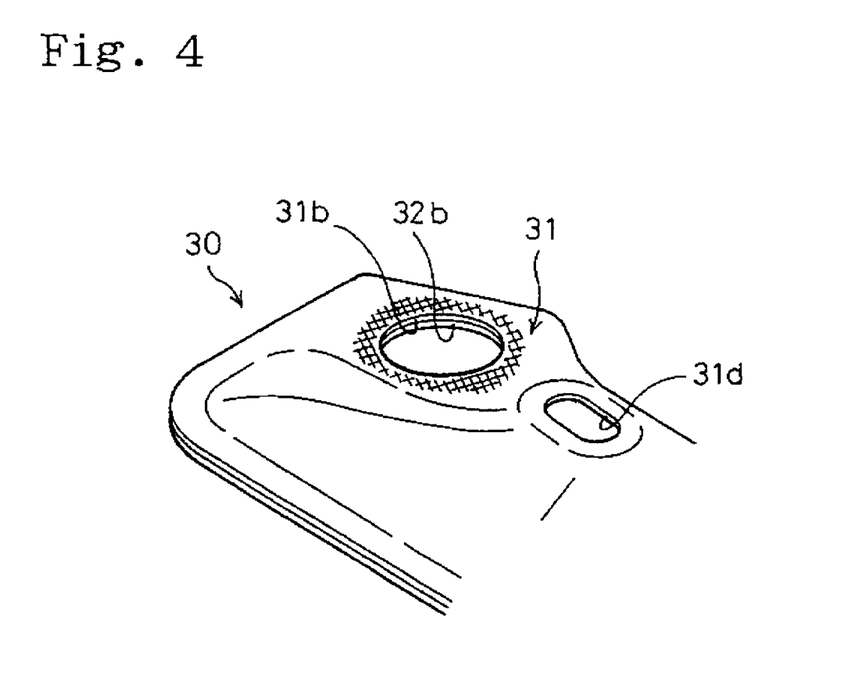
FIG. 4 is an enlarged partial perspective view of the filter.

A filter 30 comprises two plate-shaped filter media 31 and 32 which are placed one upon the other. The filter media 31, 32 are cut so as to be larger than the contour of each casing member 10, 20. The filter media 31, 32 in the flat state are pushed into the interior defined by both casing members 10, 20 such that central portions of the filter media are expanded. The expanded portions are referred to as convexities 31a and 32a, respectively. The filter media 31, 32 have circular through holes 31b, and 32b formed in the vicinity of first ends thereof, respectively. Overall peripheries of the through holes 31b, 32b are closely adhered circularly to each other, thereby forming separated portions 31c and 32c, respectively. Although the expanded portions of the filter media are shown rather exaggeratedly in the drawings, the filter media 31, 32 are slightly larger than the casing members 10, 20 such that the central portions are expanded slightly. As shown in FIG. 4, the peripheries of the through- holes 31b, 32b include portions common to the peripheries of the filter media 31 , 32 and portions adjacent to the convex portions 31a, 32a, respectively.

The filter medium 31 has an opening 31d into which the margin 12a can be inserted. Either of the casing members 10, 20 may be located at the upper side of the casing.

The assembly of the filter apparatus will be described. The filter media 31, 32 are separately cut and then placed one upon the other. After the separated portions 31c, 32c are adhered together by melting, the lower casing 10 and the filter media 31, 32 are put together at the concave side of the casing 10. The cylindrical margin 12a of the lower casing 10 is inserted into the opening 31d of the filter medium 31. Thereafter, the margin 12a is pressed so as to be opened so that the periphery of the opening 31d is held between the margin 12a and the lower casing 10, whereby the filter medium 31 is hermetically held.

The pipe 23 is connected to the through-hole 22 of the upper casing member 20. When the filter media 31, 32 are held on the lower casing member 10 as described above, the abutting face 11 of the lower casing member 10 is put into the margin 21a rising from the peripheral edge of the abutting face 21 of the upper casing 20. Then, the peripheral edges of the filter media 31, 32 are interposed between the abutting faces 11, 21 of the respective casing members 10,20. The margin 21a is then pressed toward the abutting face 11 of the lower casing 10 in the above-described state. Consequently, the lower and upper casing members 10, 20 are hermetically clamped together with the peripheral edges of the filter media 31, 32 held between the peripheral edge of the casing members, thereby forming an integral casing 40. Since each filter medium is larger than the contour of each of the casing members 10, 20, the central portion of each filter medium is expanded in the casing 40.

The overall peripheral edges of the filter media 31, 32 composing the filter 30 are held between the abutting faces 11, 21 of the respective lower and upper casing members 10, 20. Furthermore, the overall peripheries of the through-holes 31b, 32b of the respective filter media 31, 32 are closely adhered together into the separated portions 31c and 32c. Consequently, the filter 30 assumes the shape of a bag with the convexities 31a, 32a facing each other. Furthermore, the bag-shaped filter 30 is enclosed in the casing 40 having the suction and exhaust ports 12 and 23a with the opening 31d connected to the suction port 12. Accordingly, when the negative pressure is supplied through the exhaust port of the pipe 23a into the casing 40, unclean lubricating oil is drawn through the suction port 12 into the casing 40. Impurities such as iron powder are removed from the lubricating oil as it passes through the filter 30 from the inside to the outside of each filter medium.

Since the filter medium 32 faces the side of the upper casing 20, the oil, after having passed through the filter medium 32, is discharged through the exhaust port 23a. On the other hand, the oil, after having passed through the other filter medium 31, once comes out to the interior at the side of the lower casing member 10. Since the interior at the side of the lower casing member 10 communicates with the interior at the side of the upper casing member 20 through the through-holes 31b, 32b of the filter media 31, 32, the oil coming out to the interior at the side of the lower casing member 10 is also discharged through the holes 31b, 32b and the exhaust port 23a of the upper casing member 20.

The through-holes 31b, 32b are formed in the peripheral portions of the filter media 31, 32, respectively and the peripheries of the through-holes 31b, 32b are closely adhered together, as described above. Consequently, the entire peripheral edges of the filter media 31, 32 can be interposed between the peripheral edges of the lower and upper casing members 10, 20 with the interior of the lower casing member 10 communicating with the interior of the upper casing member 20.

Figure 5:
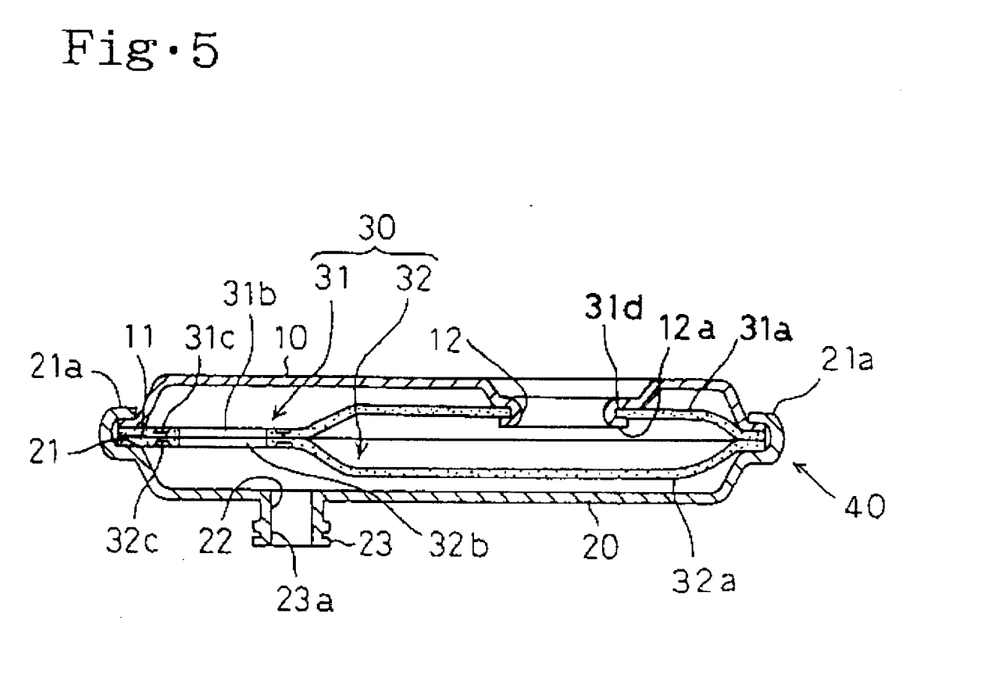
FIG. 5 is a sectional view of a first modified form of the filter apparatus in accordance with the present invention.

FIG. 5 illustrates a modified form. In the modified form, the suction port 12 and the exhaust port 23a are located away from each other so that the negative pressure from the exhaust port 23a is applied uniformly to the two filter media 31, 22. Consequently, the efficiency of filtration can be improved.

Figure 6:
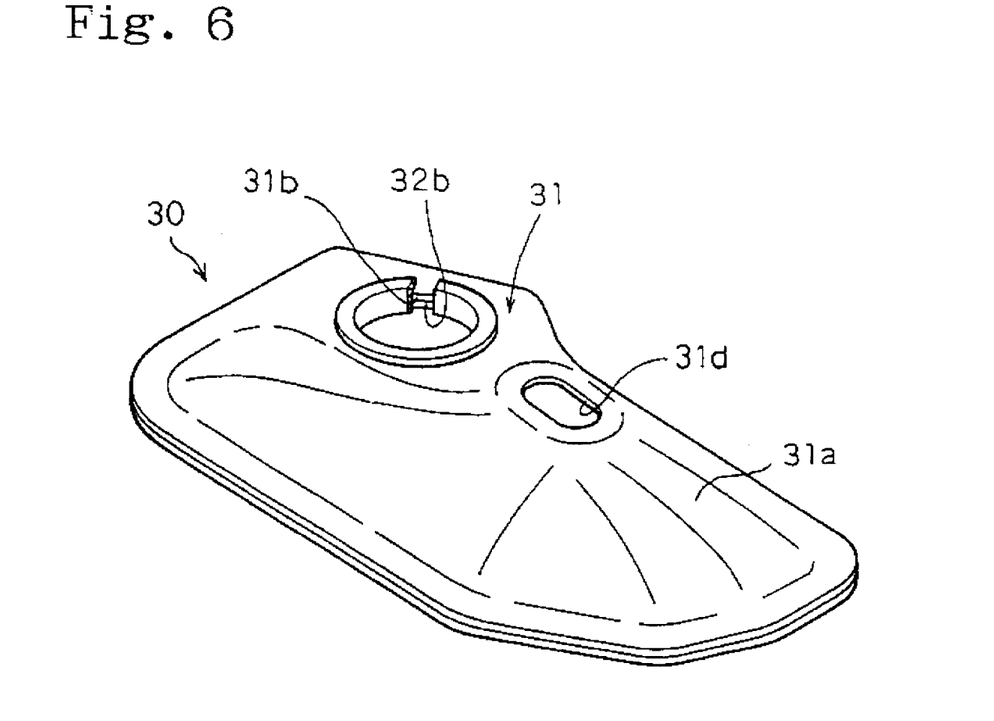
FIG. 6 is an enlarged partial perspective view of a second modified form of the filter apparatus in accordance with the present invention.
Figure 7:
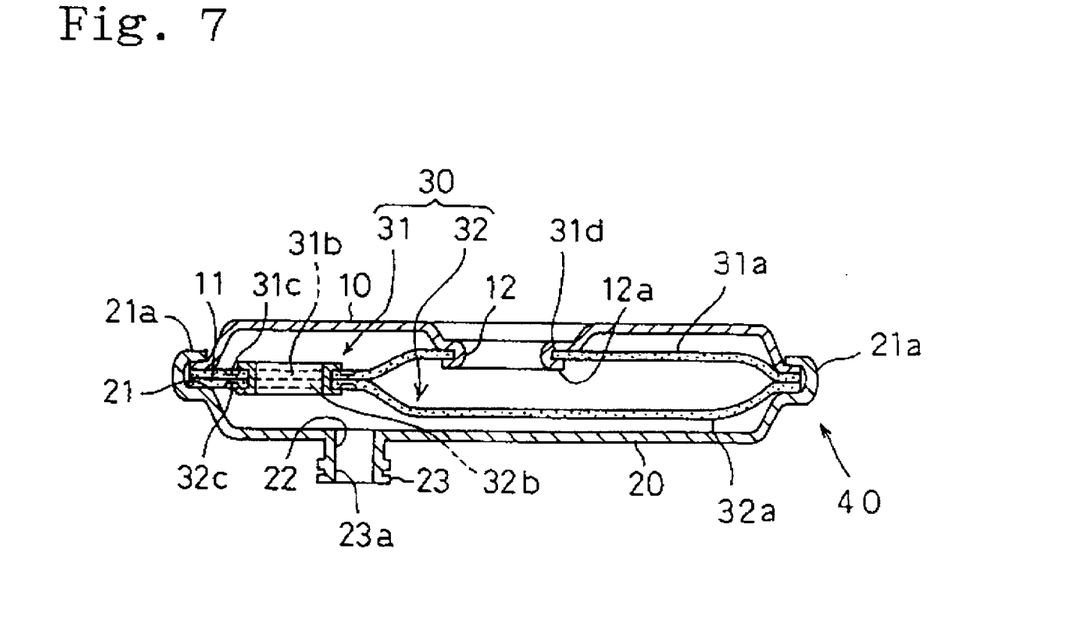
FIG. 7 is a sectional view of a third modified form of the filter apparatus in accordance with the present invention.

Although the peripheries of the through-holes 31b, 32b of the filter media 31, 32 are adhered together by melting in the foregoing embodiment, they may be bonded together by an adhesive. Furthermore, the peripheries, defining through-holes 31b, 32b may be clamped by a cylindrical metal member so as to be closely adhered together, as shown as a modified form in FIG. 6. Additionally, a cylindrical metal member may be employed for connection of the opening 31d to the suction port 12, as shown in another modified form in FIG. 7.

Figure 8:
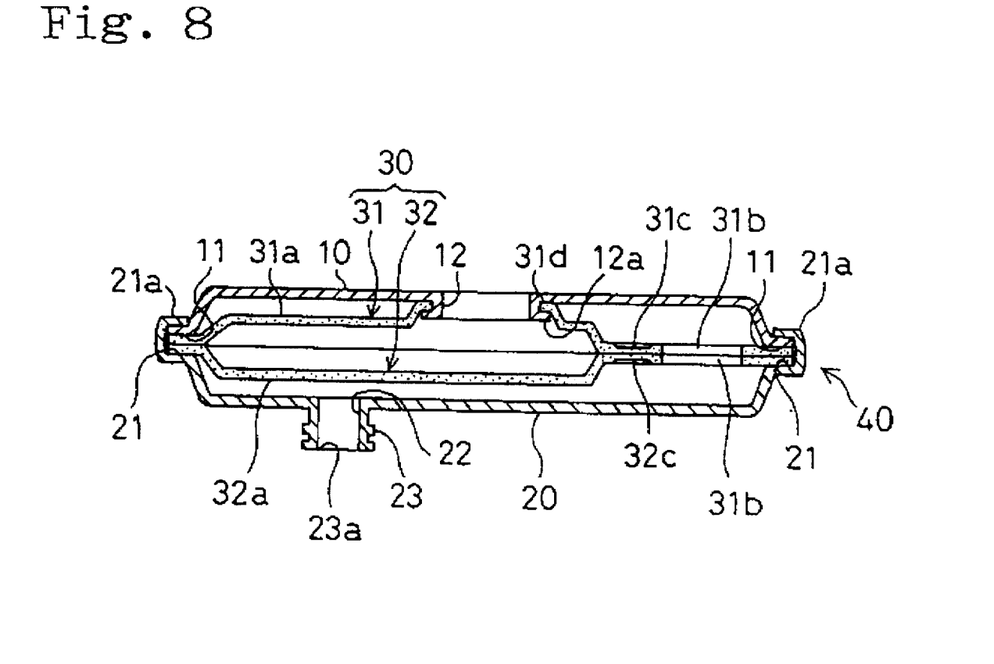
FIG. 8 is a sectional view of a fourth modified form of the filter apparatus in accordance with the present invention.
Figure 9:
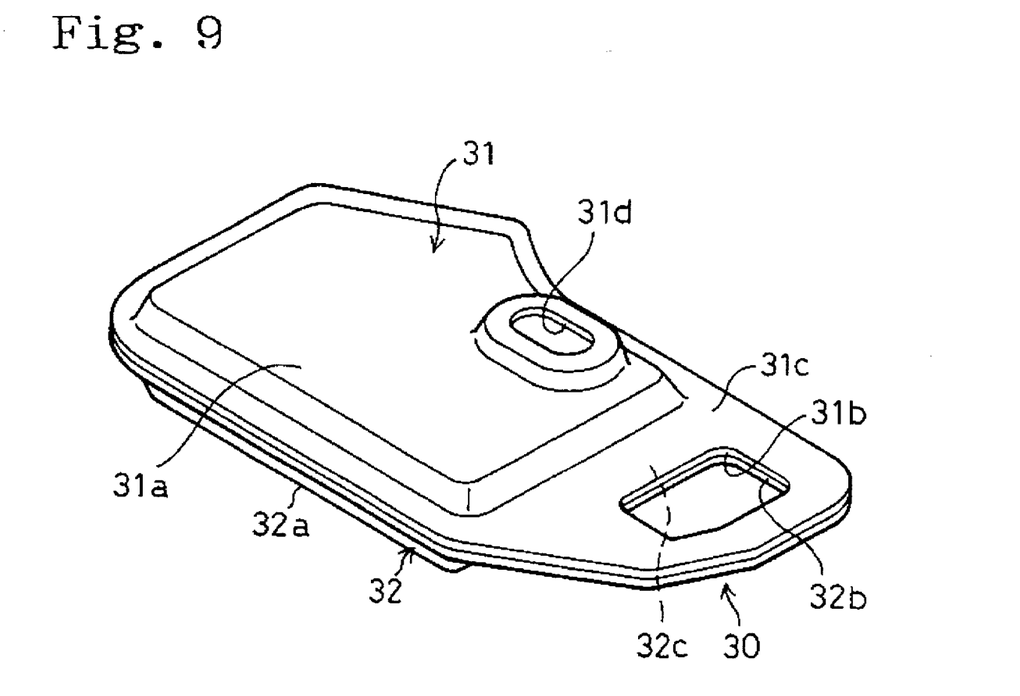
FIG. 9 is a perspective view of the filter employed in the fourth modified form of the filter apparatus.
Figure 10:
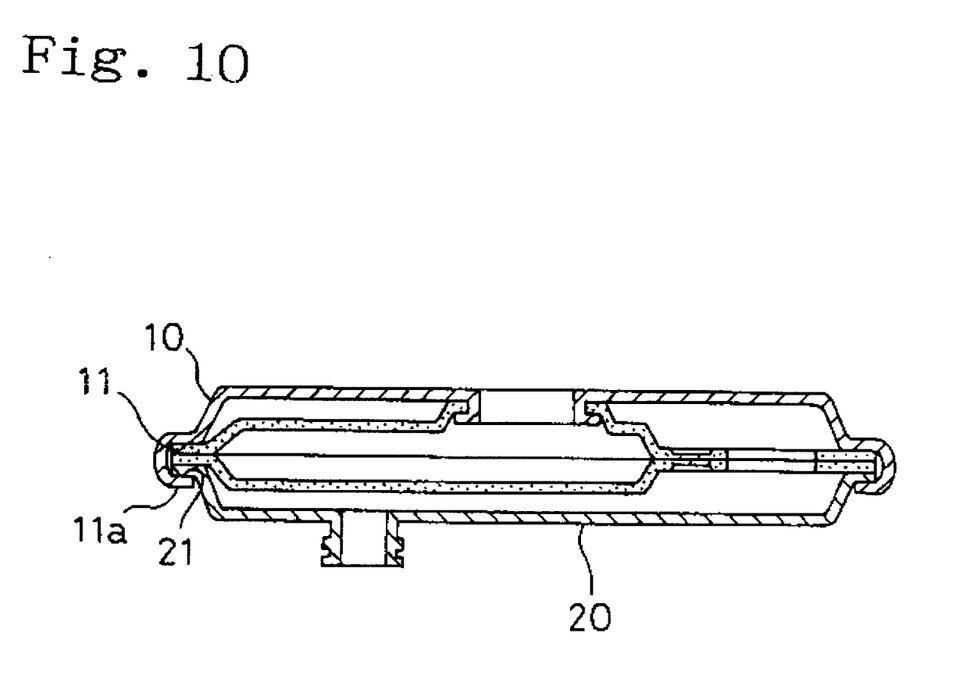
FIG. 10 is a sectional view of a fifth modified form of the filter apparatus in accordance with the present invention.

FIGS. 8 and 9 illustrate a modified form of the filter media 31, 32. In the foregoing embodiment, the filter media 31, 32 each larger than the casing members 10, 20 are pushed into the casing 40 in their flat state such that the central portion of each filter medium is expanded. In the modified form, convex portions 31a and 32a are formed in the filter media 31, 32 by way of stamping, respectively. Furthermore, the position of the through-holes 31b, 32b formed in the filter media 31, 32 in the modified form differs from that of the holes in the foregoing embodiment. Thus, the position of the through holes 31b, 32b can be determined with some freedom in the present invention. More specifically, each of the convex portions 31a, 32a of the filter media 31, 32 has the same contour as those of the lower and upper casing members 10, 20 and are formed by way of stamping into the shape of a dish except at one end portion. The filter media 31, 32 are placed one upon the other with the concave sides thereof facing each other so that a space is defined between the convex portions 31a, 32a. The filter media 31, 32 have rectangular through-holes 31b and 32b formed in the unstamped thereof, portions respectively. Three of four sides of the through-holes 31b, 32b extend along the peripheries of the filter media 31, 32 and the other side thereof is adjacent to the convex portions 31a, 32a. The entire peripheries of the through-holes 31b, 32b are adhered together by melting, thereby serving as the separated portions 31c, 32a. Each of the filter media 31, 32 is formed by impregnating a nonwoven fabric with phenol and then pressing it. Heat is then applied to the pressed fabric so that it is hardened.

Although the filter media 31, 32 are separately cut in the foregoing embodiment, one sheet of filter medium may be folded back. The filter medium may be folded back at any portion thereof though the filter medium has a fixed folded portion in the prior art. Furthermore, although the filter apparatus is used to filter oil in the foregoing embodiment, it may be used to filter other fluids such as water.

The margin 21a for receiving the peripheral edge of the lower casing member 10 is formed by upwardly bending the peripheral edge of the abutting face 21 of the upper casing member 20 in the foregoing embodiment. A margin 11a may be formed on the peripheral edge of the abutting face 11 of the lower casing member 10, instead. These margins 21a, 11a may be used for positioning the casing 40. The working efficiency in the assembly of the filter apparatus can be improved when such a margin is formed at any suitable portion in accordance with an order of assembling steps.

In the foregoing embodiment, the opening 31d of the filter 30 is connected to the suction port 12 of the upper casing member 20 and the negative pressure is applied to the outer face of the filter 30 through the through-hole 22 serving as the exhaust port so that dust accumulates on the inner surface of the filter 30. Alternatively, the through hole of the filter 30. Alternatively, the through- hole 22 may serve as the suction port and the suction port 12 may serve as the exhaust port so that the dust accumulates the outer surface of the filter 30. In this regard, the bag-shaped filter 30 is rendered narrower when the negative pressure is applied thereto. Spacers need to be provided in the filter 30 so that it is normally maintained in the expanded state.

Figure 15:
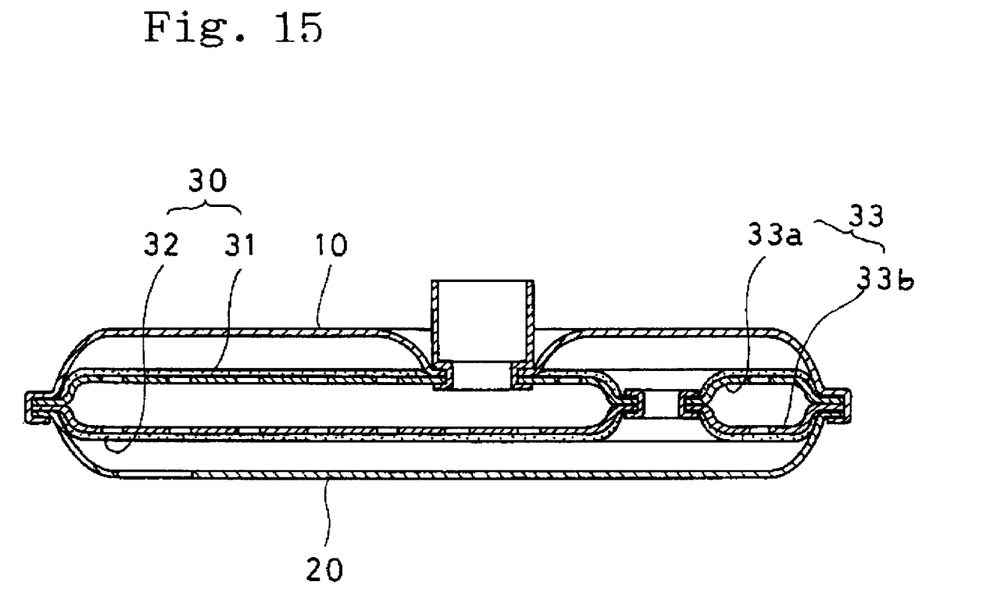
FIG. 15 is a sectional view of a modified form of the filter apparatus in accordance with the present invention.
Figure 16:
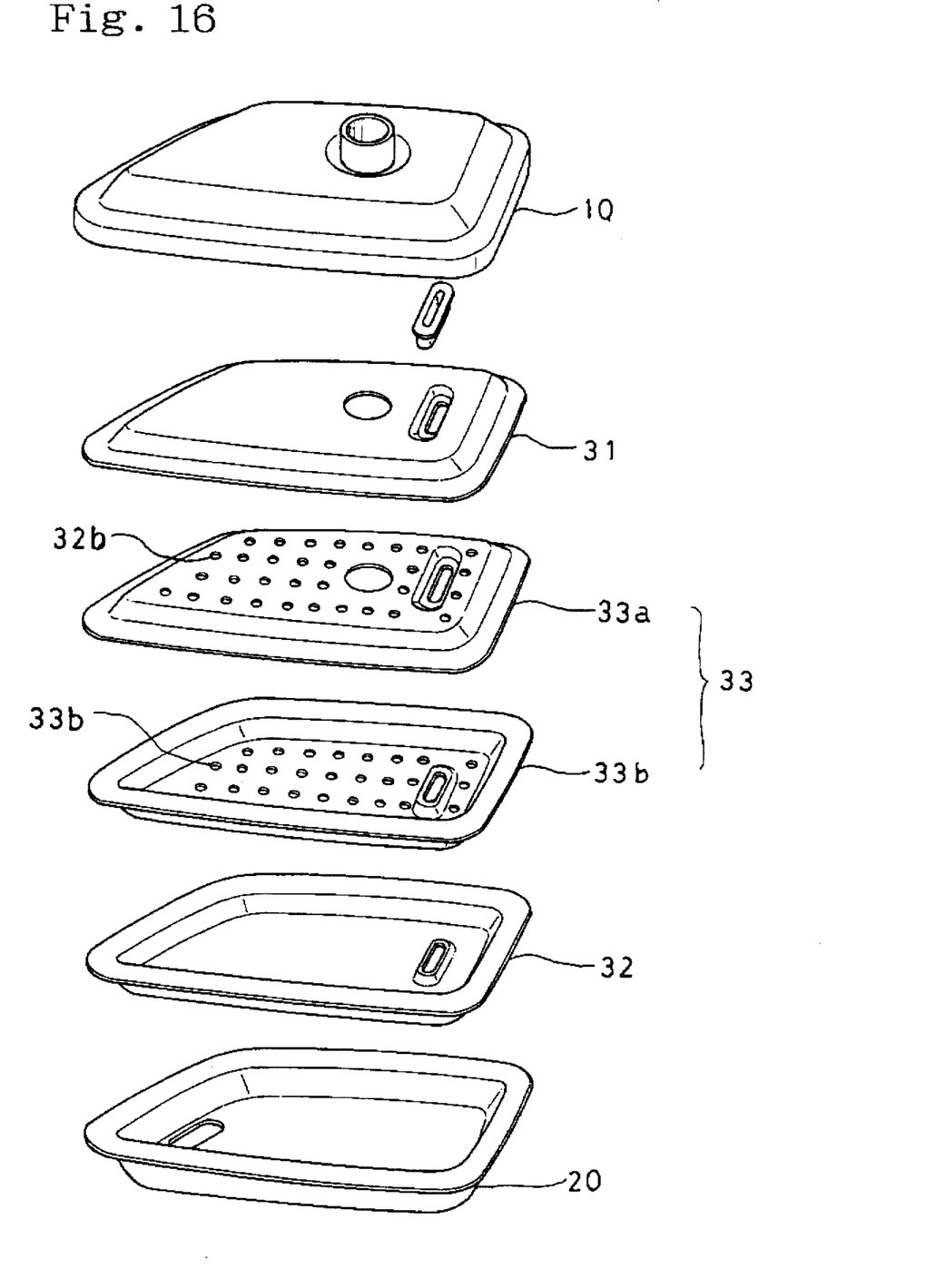
FIG. 16 is a perspective view of a modified form of the filter apparatus in accordance with the present invention.

One example of the filter apparatus which uses the spacer is illustrated in FIG. 15 and FIG. 16. The spacer 33 has almost the same shape as the upper and lower filter media, 32, and plurality of penetration holes are formed in the spacer 33. The upper and lower filter media 31, 32 accommodate the corresponding pair of upper and lower spacer members 33a, 33b therebetween, and the filters 31, 32 are installed in the casings.

The foregoing description and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

We claim:

1. A filter apparatus comprising:

a generally box-shaped casing comprising a first casing member having a concavity and a peripheral edge extending around the concavity, and a second casing member having a concavity and a peripheral edge extending around the concavity, the peripheral edges of said first and said casing members being connected to each other with a substantially uniform gap defined entirely therebetween and with the concavities of said casing members facing each other so as to collectively define the interior of the casing, and said casing having a suction port and an exhaust port each placing the interior of the casing in communication with the exterior of the casing; and a filter having the form of a bag and disposed in said casing, said filter comprising a first piece of filter medium and a second piece of filter medium, the entire peripheral edge of the first piece of filter medium being superposed with the entire peripheral edge of the second piece of filter medium, the superposed peripheral edges of said filter pieces being disposed and hermetically held in the entire gap between the peripheral edges of said first and said second casing members, and said first and said second filter pieces each having an open through-hole extending therethrough, the through-holes of said filter pieces being aligned and said filter pieces being joined to one another along portions thereof defining the peripheries of said through-holes, the aligned through-holes placing one portion of the interior of said casing defined to one side of the filter in communication with another portion of the interior of said casing defined to the other side of the filter, and the interior of the filter being in open communication with one of said ports.

2. A filter apparatus as claimed in claim 1, wherein adhesive adheres said filter pieces to one another along said portions thereof defining the peripheries of said through-holes.

3. A filter apparatus as claimed in claim 1, wherein said first filter piece and said second piece are melted to one another at said portions thereof defining the peripheries of said through-holes.

4. A filter apparatus as claimed in claim 1, wherein a metal member crimps said filter pieces to one another along portions thereof defining the peripheries of said through-holes.

5. A filter apparatus as claimed in claim 1, and further comprising a spacer interposed between said first and said second filter pieces and keeping respective portions of said first and said second filter pieces spaced apart from one another to maintain the filter in an expanded state.

6. A filter apparatus as claimed in claim 5, wherein said spacer is a hollow perforated member.

7. A filter apparatus as claimed in claim 6, wherein said spacer comprises an upper spacer member having a plurality of penetration holes, constituting perforations, extending therethrough, and a lower spacer member also having a plurality of penetration holes, constituting perforations, extending therethrough, said spacer members also having respective peripheral edges that are superposed with and connected to one another.

8. A filter apparatus as claimed in claim 7, wherein the peripheral edges of said spacer members are interposed between and superposed with the peripheral edges of said filter pieces within the entire gap between the peripheral edges of said sealing members.

9. A filter apparatus as claimed in claim 1, wherein said suction port is defined in said first casing member on one side of said casing, and said exhaust port is defined away from said suction port on the other side of said casing in said second casing member at a location close to said aligned through-holes.

* * * * *